Aug. 19, 1958 C. CARROLL 2,848,571
REMOTE MANUAL SWITCHING MECHANISM FOR ELECTRIC HOIST
Filed July 9, 1956 6 Sheets-Sheet 1

Inventor
Charles Carroll
Attorney

Aug. 19, 1958     C. CARROLL     2,848,571
REMOTE MANUAL SWITCHING MECHANISM FOR ELECTRIC HOIST
Filed July 9, 1956     6 Sheets-Sheet 2

Inventor
Charles Carroll
Attorney

Aug. 19, 1958  C. CARROLL  2,848,571
REMOTE MANUAL SWITCHING MECHANISM FOR ELECTRIC HOIST
Filed July 9, 1956  6 Sheets-Sheet 3

Inventor
Charles Carroll
Attorney

Aug. 19, 1958     C. CARROLL     2,848,571
REMOTE MANUAL SWITCHING MECHANISM FOR ELECTRIC HOIST
Filed July 9, 1956     6 Sheets-Sheet 6

Inventor
Charles Carroll
Attorney

United States Patent Office 2,848,571
Patented Aug. 19, 1958

2,848,571

REMOTE MANUAL SWITCHING MECHANISM FOR ELECTRIC HOIST

Charles Carroll, Danville, Ill., assignor to Duff-Norton Company, Pittsburgh, Pa.

Application July 9, 1956, Serial No. 596,563

8 Claims. (Cl. 200—47)

The present invention relates to the general field of controls, and more specifically remote manual switching controls for electric motors. The invention finds specific utility when used in electric hoists. More generally utility of the invention is realized when it is employed as a remote electric motor control in installations where it is undesirable to have an electric current running near the hand of the operator.

Electric hoists which are moved about on an overhead mono-rail are well known in many factory installations. The medium sized units are usually operated by one man. Generally the loads are lifted and then rolled along the overhead mono-rail to a different place in the warehouse or plant. Quite often this necessitates moving in and out of doors.

Naturally such electric hoists must be provided with controls to start, stop, and reverse their electric motors. Two types of such controls are known. The manual type consists of two ropes. This, of course, requires two hand operation and is clumsy at best. The other type is a complex push button control which is both expensive and dangerous as a current travels to the hand of the operator.

In view of the foregoing, it is the general object of the present invention to provide a remote manual control for electric motors which is insulated from electrical contact and yet may be simply operated with one hand.

Another object of the invention is to furnish a simple remote manual control for an electric motor such as found in a hoist which is inexpensive to construct and maintain.

A more detailed object of the invention is to provide a remote manual control for an electric hoist which utilizes pre-existing equipment for its action. A related detailed object of the invention looks to the provision of a manual remote switch for an electric hoist which cooperates with a limit switch to "telegraph" the latter's action to the hand of the operator.

Further objects and advantages of the present invention will become apparent as the following description of illustrative embodiments of the invention proceed taken in conjunction with the accompanying descriptive drawings in which:

Figure 1:
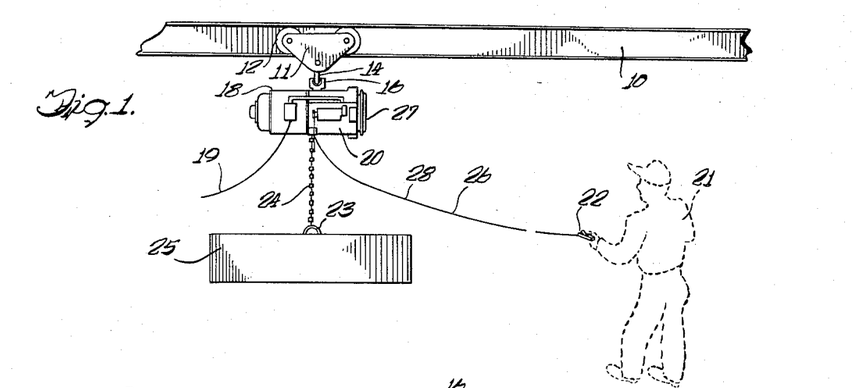
Figure 1 is a figurative illustration of a hoist being operatively controlled by a remote control device illustrative of the invention.

Before going into the details of construction of the exemplary embodiments of the invention which have been portrayed in the accompanying drawings, it will prove helpful to reflect upon the environment in which the invention finds specific application. Referring now to Fig. 1, it will be seen that a typical mono-rail system for supporting an electric hoist is shown. The mono-rail 10 supports a trolley mechanism 11 which, by way of trolley wheels 12 may be shifted along the mono-rail 10. A hook 14 extending from the trolley mechanism 11 engages the eye 15 of the hoist hangar 16 thereby supporting a hoist 18 for movement along the mono-rail 10. The hoist 18 is powered by electricity fed through power line 19. The remote hand control mechanism 22 is actuated by the operator 21 requiring only the use of one hand. Upon pressing one portion of the hand control mechanism 22, the electric motor in the hoist is actuated and reels the support chain 24 on to the hoist drum (not shown) thereby lifting the load 25. When the operator releases the hand control 22, the spring-loaded switch mechanism stops the upward travel of the load 25 by turning off the power to the driving motor of the electric hoist 18. Similarly when the operator reverses the hand switch mechanism 22, the driving motor of the electric hoist 18 reverses and permits the load 25 to be lowered.

The load 25 may be shifted from place to place along mono-rail 10 by a manual push given by the operator or a rope may be fastened to the hoist 18, or to the trolley 11. Although the operators are repeatedly admonished against pulling the hoist by the control cable 26, they are more often than not prone to do so. For this reason a safety chain 28 is secured to the control cable assembly 26.

Because of the heavy loads involved, and the necessity for suspending them at various levels, sometimes for long periods of time, it has become the practice to employ a safety brake 27 on the majority of electric hoists. The safety brake is so constructed as to be constantly engaged to prevent a lowering of the chain 24 by means of a rotation of the drum in the electric hoist 18.

Because many of the hoist and mono-rail systems employed in factories, warehouses, and storage yard may become wet, there is a definite hazard to the operator if a switching mechanism is employed which passes any electric current to his hand. In addition, such remote electric controls are expensive to install, and also involve maintenance by skilled personnel.

In broad outline, the switching mechanisms contemplated by the present invention are positive acting, involve no electrical current in the hand of the operator, and are inexpensive to construct and simple to maintain. The remote manual switching device shown divides itself into two assemblies at both ends of a sheathed cable control assembly 26. The control cable assembly 26 contemlates both a sheath 29 and a control cable 30. The hand control assembly, shown in Fig. 2, as designated by the numeral 22, is secured at one end of the control cable assembly 26 and delivers a "push-pull" intelligence of the control cable into hoisting, lowering, and the safety braked neutral operating conditions of the associated electric hoist.

Three embodiments of the switching mechanism 31 have been illustrated in the drawings and will be described in detail. Similarly three embodiments of the hand control assembly 22 have been illustrated in the drawings and will be described in detail.

*The hand control assemblies*

The principal purpose of the hand control assembly is to deliver intelligence to the control cable 30. In two of the hand control assemblies shown, this intelligence is delivered in the form of a "push-pull" motion transmitted to the control cable 30. In the third embodiment shown the intelligence transmitted to the control cable 30 is rotational, either clockwise or counter clockwise.

Figure 2:
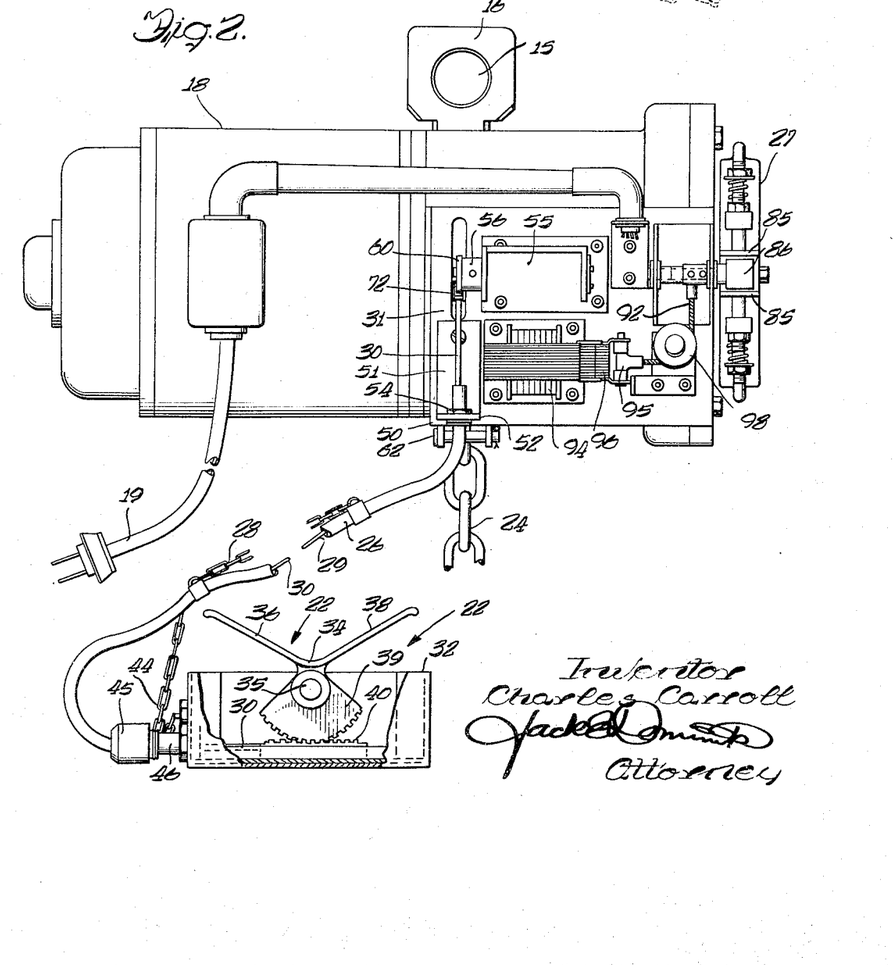
Fig. 2 is a plan view in partial section illustrating the assembled relationship between the basic components of one embodiment of the invention.
Figures 7, 8, 9, 10:
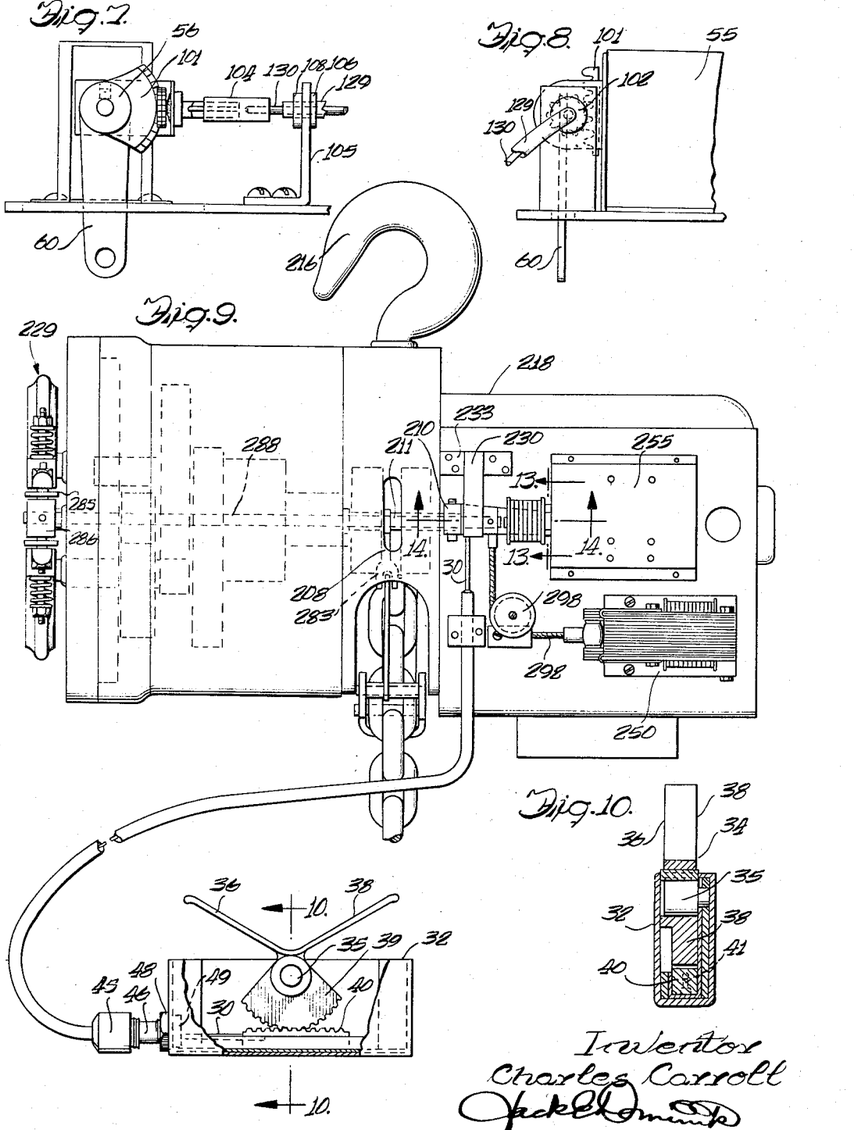
Fig. 7 is a front elevation view of the remote switch actuating mechanism which is shown in Fig. 5 in plan view.
Fig. 8 is an end view of the mechanism shown in Fig. 7 taken from the right end.
Fig. 9 is a front elevation of an electric hoist illustrating an alternative embodiment of the invention.
Fig. 10 is a sectional view of the control handle taken along section 10—10 of Fig. 9.

Referring now to the lower portion of Fig. 2, it will be seen that the hand control assembly contemplates a housing 32 to which a winged handle 34 is pivotally mounted on a pivot pin 35 (see Fig. 10). The wings 36, 38 are oriented fore and aft of the handle assembly 34. A gear segment 39 extends downwardly from the pivot 35 of the handle assembly 34 and matingly engaged a toothed rack 40. The control cable 30 is secured to the forward portion of the rack assembly 40 by means of a set screw 41. In operation when the forward wing 36 of the handle assembly 34 is depressed in relation to the housing 32, the gear 39 and rack 40 retard or pull the cable 30. Similarly when the rearward wing 38 of the handle assembly 34 is depressed, the gear segment portion 39 of the handle assembly 34 transmits a forward or push motion to the rack assembly 40 and pushes the cable 30 forwardly.

Figure 16:
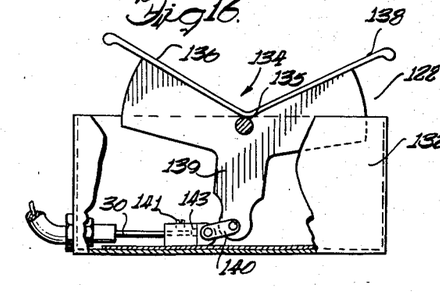
Fig. 16 is an enlarged partial section showing an alternative form of hand control mechanism.

Referring now to Fig. 16 it will be seen that an alternative embodiment of a hand control assembly 122 has been shown. There a housing 132, similar to housing 32 described above, holds the contents of the unit. The handle assembly 134 is pivotally mounted on pivot pin 135 and has a forward wing portion 136 and a rearward wing portion 138, the movement of which is transmitted to the downward extending handle arm portion 139. At the extreme end of the handle arm portion 139 a link 140 is pivotally secured at both ends respectively to the handle arm 139 and a cable grip 143. A set screw 141 securely grips the cable 30. The operation of the alternative "push-pull" hand assembly 122 is substantially identical to that disclosed above, that is, by alternately depressing the wings 136, 138 of the handle assembly 134, the "push-pull" motion is imparted to the cable 30.

Figures 4, 5, 6:
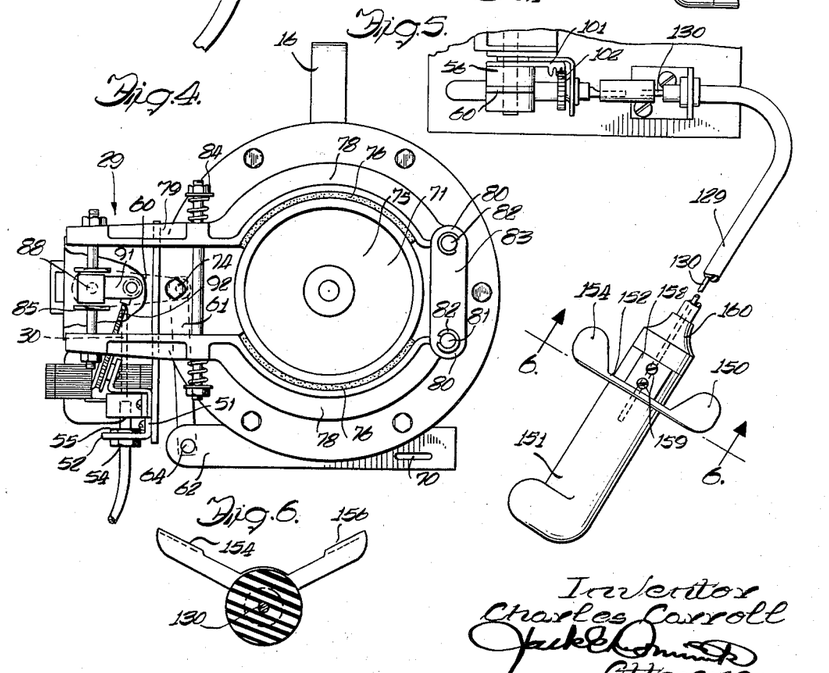
Fig. 4 is an end view of the mechanism shown in Fig. 2 taken from the right end of the mechanism.
Fig. 5 is an alternative embodiment of a hand controlled mechanism.
Fig. 6 is a sectional view of the hand control mechanism shown in Fig. 5 taken along section 6—6 of Fig. 5.

An additional hand control mechanim has been shown in Figs. 5 and 6. The rotational hand control assembly 150 transmits rotational intelligence to the cable 130, as distinguished from the "push-pull" intelligence described above. The rotational hand control assembly 150 contemplates a handle 151 proportioned to fit securely within the operator's hand. A twisting plate 152 having a pair of lateral wings 154, 156 is secured within the rotational assembly by means of an extended boss 158. A pair of set screws 159 are threaded within the boss 158 to firmly engage the control cable 130. In operation, when the operator grasps the handle 151 and depresses the wing 156 a clockwise rotational action is imparted to the control cable 130. Similarly, when the left wing 154 is depressed a counter clockwise motion is imparted to the control cable 130. A control cable sheath gripping section 160 is provided at the forward portion of the rotational control assembly 150 to insure a firm mounting of the control cable sheath 129, thereby providing for rotational movement of the control cable 130 relative to the stationary position of the sheath 129.

Figures 17, 18, 19:
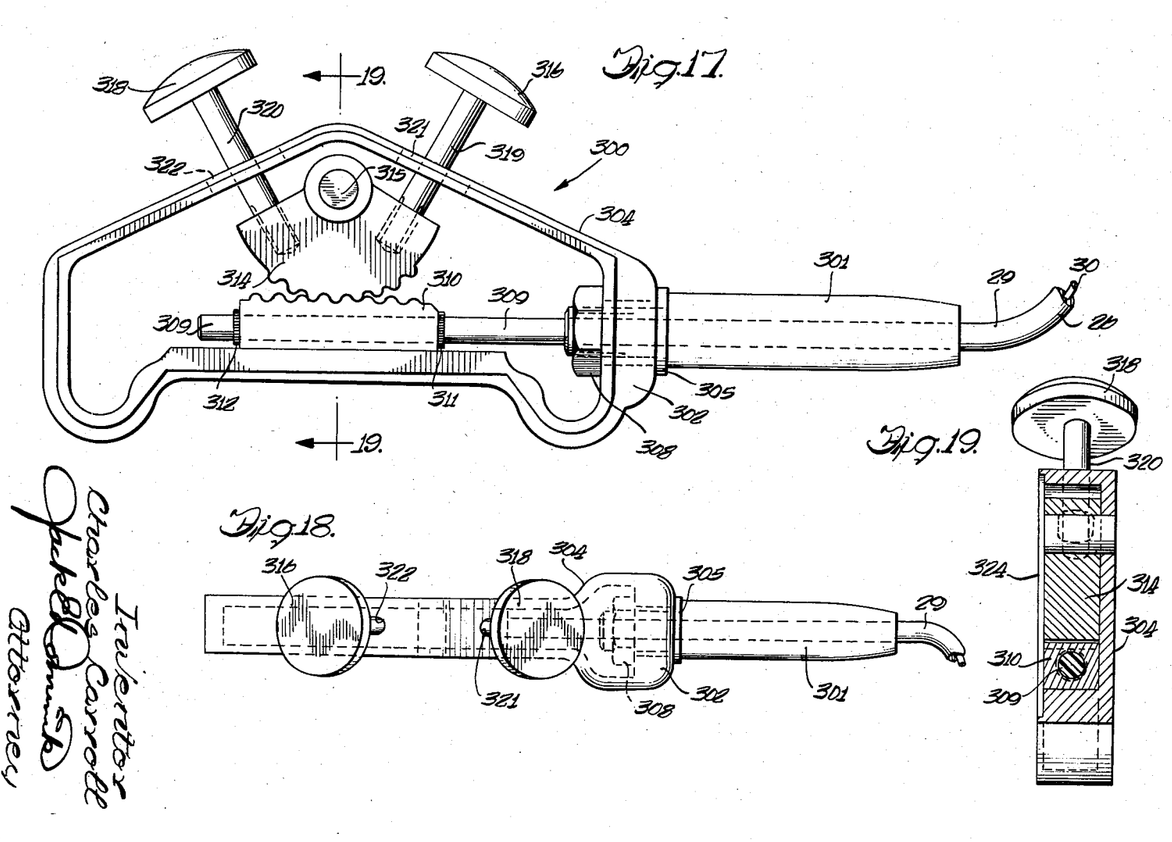
Fig. 17 is a front elevation of an alternative type control handle.
Fig. 18 is a top view of the alternative type control handle shown in Fig. 17 in reduced scale.
Fig. 19 is a vertical section taken through the alternative type control handle along section line 19—19 of Fig. 17.

Still another type of control handle assembly 300 is shown in Figs. 17 through 19. Because the control handle normally dangles at the lower end of the control cable assembly 26, it will prove advantageous to provide for easy operation by depressing a control button with one hand. The mechanism shown in the alternative embodiment achieves this result.

Referring now to the drawings, it will be seen that the control cable sheath 29 is surrounded by a control cable sleeve 301 which engages the upper portion 302 of the housing 304. The sleeve 301 is hollow to permit the passage therethrough of the control cable assembly 26. A shoulder 305 at the lower portion of the sleeve 301 abuts the upper end of the housing 302. The control cable sleeve 301 has a threaded extension to which the sleeve like nut 308 is affixed. The upper face of the sleeve like nut abuts the shoulder 305 of sleeve 301, the diametrical and lateral tolerances between the sleeve like nut and the handle section at 302 being such that rotation is possible.

The control cable 30 itself is secured by convenient means to the control rod 309. The control rod 309 runs through the rack 310 and is secured against lateral movement by means of control rod retaining rings 311, 312. Rotation of the housing 304 is, therefore, permitted with respect to the control cable 30 and the control cable sheath 29 without twisting or fouling the control cable assembly 26, thereby facilitating the operator's use of the handle.

A push-pull is imparted to the control cable 30 by means of the segmented gear 314 which engages the rack 310. The segmented gear 314 is secured to the frame 304 by means of the gear pin 315. The segmented gear 314 is cocked by depressing the up-button 316 or down-button 318. This action is transmitted through the up-button support shaft 319 and the down-button support shaft 320 which are threaded or otherwise secured to the segmented gear 314. Button support shaft slots 321, 322 are of sufficient width to accommodate the rocking action of the respective support button shafts 319, 320.

By securing a cover plate 324 to the frame assembly 304 mechanism, as shown in Fig. 17, is completely encased. The cover plate 324 serves the additional function of aligning the rack 310 for a fore and aft rocking motion.

Because of the action of the motor control switch assembly, the hoist will only move upwardly so long as the up-button 316 is depressed. When the up-button 316 is released, the motor shuts off and the hoist is in the neutral position. A similar action takes place when the down-button 318 is depressed. In addition, the danger of catching the operator's hand beneath the control button is minimized by the encasing of the assembly

*The cable assembly*

As pointed out above the cable assembly 26 contemplates a cable covering or sheath 29 and a cable 30 hoist by the sheath 29. The cable assembly 26 is secured to the hand control assembly by means of a cable mounting assembly 44. The mounting assembly 44 includes a sheath grip collar 45 which securely binds the sheath portion 29 of the cable assembly 26 and anchors it with respect to the housing 32 thereby insuring motion of the cable 30 relative to the sheath 29 so that the "push-pull" intelligence transmitted to the cable 30 by the hand control assembly 22 may be translated into hoist control switching intelligence at the switching assembly 31 of the electric hoist 18.

The motor control assembly

In the embodiments of the motor control switch assembly shown, a cooperative correlation has been insured between the motor switch, the limit stop, and the safety brake assemblies provided on the electric hoist assembly. As pointed out above, each of the electric hoists shown have been provided with a safety brake which is set at all times except when the load is being raised or lowered. The novel manual switching means has been correlated with the safety brake, and in addition has been correlated with the limit stop in such a manner that when the load has been raised to its limit, or if the hoisting chain or cable becomes kinked, the intelligence is transmitted back to the hand of the operator who is warned of the extreme condition by both his senses of sight as well as touch. These unique functions will become apparent as the detailed construction of the various switching assemblies are described.

Referring now to Fig. 2, it will be seen that the control cable assembly 26 is secured to the switching assembly 31 by means of an L-shaped bracket 50. The mounting bracket 50 includes a mounting plate or leg portion 51 which is bolted to the housing of the electric hoist 18, or otherwise permanently secured to the housing. A control cable mounting leg 52 extends from the hoist assembly 18 and is bored to receive a pair of control cable assembly locking nuts 54. The function of the control cable locking nuts 54 is to securely fix the control cable sheath 29 with relation to mounting leg 52 so that the push-pull motion of the control cable is manifested with relation to the electric hoist assembly 18. The motor switch control assembly 55 is provided on the hoist with switching poles so oriented in position that when the switch box external control shaft 56 is rotated or rotated clockwise and then counter clockwise, the hoist motor is switched from clockwise to counter clockwise rotation. The switch is additionally biased by a centering spring (the details of which appear in subsequent embodiments) which is of sufficient strength to return the switch assembly 55 to the "off" condition when positive pressure has not been applied to the switch control assembly shaft 56.

Referring now to Fig. 4, it will be seen that a switching link 60 has been provided which is secured at one end to the switch assembly control shaft 56, and at its other end to a limit link 61. The limit link 61 is similarly secured at its end to the remote end of a limit bar 62 by means of a pivotal connection 64. The limit bar 62 is an elongate U-shaped member, the parallel legs 65, 66 of which are traversed by a pivot mounting pin 68 secured by a spacing collar 69 (see Fig. 3). A safety ring 70 is secured between the limit bar pivot pin 68 and the limit bar closed end 71 and is of such inner diameter to prevent the passage therethrough of any kinked portion of the lifting chain 24, or of any knot or twist which might occur in a hoist cable.

As shown in Figs. 2, 4, the control cable 30 is coupled to the switch link 60 by means of a pivotal mounting assembly 72. The cable is secured to the switch link 60 between the central axis of the switch shaft 56 and the pivotal end connection 74 joining the switch link 60 with the limit link 61.

Figure 3:
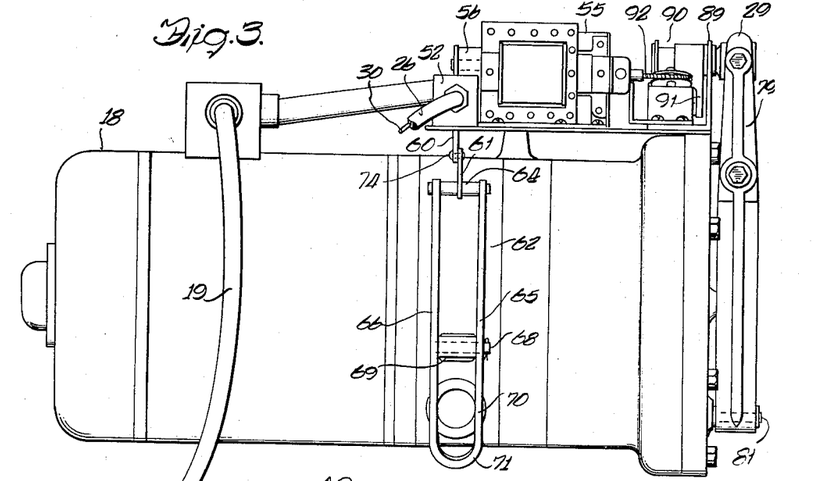
Fig. 3 is a bottom view of the mechanism shown in Fig. 2.

As discussed before, a safety brake assembly 27 is employed to secure the hoisting drum of the hoist assembly against rotation. This safety brake must be released in order to raise and lower the chain 24. The release mechanism will be better understood in the light of the construction of the safety brake. The safety brake assembly 27 contemplates a safety brake drum 75 to which the brake lining 76 of the brake shoe assemblies 78 is applied. The two brake shoe assemblies 78 have an arc-shaped portion which support the brake linings 76 and a pair of legs 79 which serve to control the safety brake. A pair of pivots 80 are provided at the terminals of the arcuate portion of the brake shoe assemblies 78 and are secured to the housing by means of pivot pins 81 and retaining link 83 biasing the pivot pins 81 and secured in place by a pair of lock rings 82. The legs 79 of the brake shoe assembly 78 are biased by a spring-loaded locking assembly 84 which bear inwardly on the legs 79 thereby locking the brake shoes against the drum 75. To release the brake shoe, a pair of release flats 85 are provided at the extremity of the brake shoe legs 79. The brake shoe unlocking mechanism contemplates a rectangular unlocking block 86 pivotally mounted to the hoist assembly by means of a pivot pin 88 journaled within the support provided by the legs 89 of the unlocking assembly mounting bracket 90. An unlocking link 91 is secured to the unlocking block journal pin 88 in such a manner that when its extremity is pulled by means of the unlocking cable 92 the unlocking block 86 is canted with relationship of the unlocking flats 85 thereby separating the unlocking flats 85 against the yieldable locking action of the locking assembly 84 releasing the brake shoe assembly 78 from the brake drum 75. This unlocking action is provided by means of an unlocking solenoid assembly 94 which by means of the unlocking cable yoke 95 is secured to the unlocking cable 92. The lateral action of the solenoid plunger 96 is translated by means of the motion of the unlocking cable 92 over the unlocking cable pulley 98 into an unlocking action at the brake shoe as described above.

In review, the function of the control mechanism will demonstrate its truly advantageous features. First, the operator depresses one of the wings 36, 38 of the hand control assembly 22. This in turn imparts a push or pull to the control cable 30, the intelligence of which is transmitted to the switch link 60. The switch link 60 actuates the switch assembly 55 to provide a two-fold action, the actuation of the hoisting motor and a release of the safety brake assembly 27.

As the chain 24 or other hoisting medium is wound up on the drum within the electric hoist 18, the work load mounting hook 23 engages the limit bar assembly 62. In almost simultaneous manner the limit bar assembly 62 is tilted transmitting this action through the limited bar link 61 to the control switch link 60 thereby switching the motor off and simultaneously de-energizing the safety brake control solenoid 94 which stops the upward travel of the chain 24 and locks the safety brake 29. Because the switch control link 60 is actuated in the course of this limit bar operation, the reaction is transmitted backward to the operator through a push on the control cable 30 which in turn actuates the forward wing 36 of the control handle assembly 34 upwardly, thereby positively reminding the operator that the upward limit of travel has been reached. Similarly, should the chain 24 have a kink in it, the kink will engage the safety ring 70, and stop the upward travel of the load 25 and positively remind the operator that the limit of travel has been reached. All of these functions are carried out without transmitting any current to the hand of the operator by means of a simple, fool-proof and inexpensive manual control mechanism.

Before discussing an alternative embodiment of the push-pull control mechanism employed on a different type hoist construction, the rotational transmission of intelligence to the switch assembly 55 will be described. Turning now to Figs. 5, 7, and 8, it will be seen that the rotational transmission of control intelligence employs substantially the same linkage as involved in the push-pull mechanism described above. In addition, however, an arcuate gear rack 101 has been fixed to the control switch actuating shaft 56. A driving gear 102 is drivingly coupled with a cable assembly 104 to the rotating cable 130. The rotating cable sheath 129 is fixed to the mounting bracket 105 by means of locking nuts 106, 108.

In operation, when the control wings 154, 156 of the rotational hand control assembly 150, as shown in Fig. 5, are depressed, the control cable 130 transmits the clockwise or counter clockwise motion to the driving gear 102. This in turn applied a rotational action through the arcuate rack assembly 101 to the switch drive 56 in the same fashion as the push-pull device. The switch link 60 is similarly displaced and may be displaced by the limit link 61 and limit bar 62 to embody the identical safety features described in connection with the push-pull device.

Figure 11:
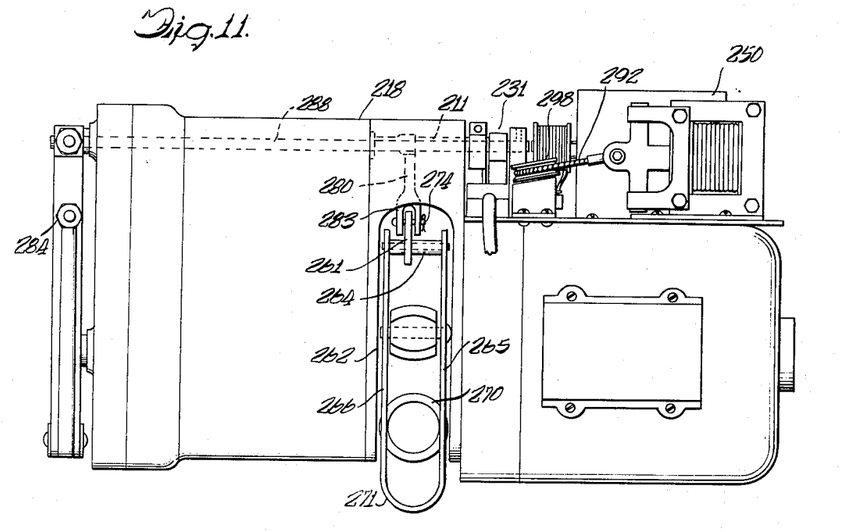
Fig. 11 is a bottom view of the hoist shown in Fig. 9.
Figure 12:
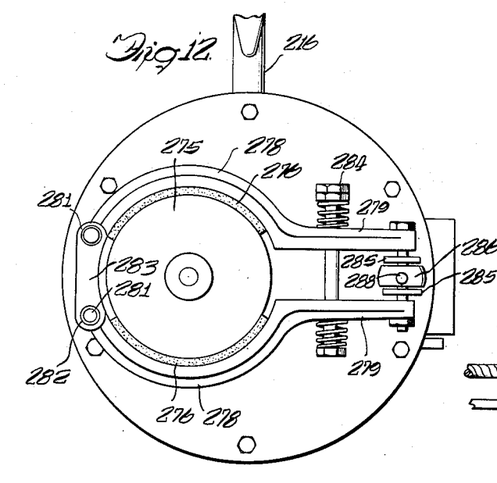
Fig. 12 is an end view of the hoist mechanism shown in Fig. 9 taken from the left end and showing the safety brake construction.

The adaptability of the remote switching system is further illustrated by its usage with the different type electric hoist construction shown in Figs. 9, 11 and 12. There it will be seen, that the hoist 218 is supported by means of a hook 216 secured to its upper portion. The safety brake assembly 229 is located at the end of the hoist remote from the switch box assembly 255 and the solenoid drive assembly 294 which releases the safety brake assembly 229.

The safety brake construction, shown best in Fig. 12, contemplates an arcuate brake shoe 278 and associated brake linings 276. The forwardly extending legs 279 of the brake shoe assembly 278 are yieldably urged to each other by a spring loading assembly 284. At the opposite end of the brake shoe assembly 278 pivot pins 281 plus a locking plate 283 and lock rings 282 orient the brake shoe assembly around the brake drum 275. A rectangular brake release 286 is secured to a brake release rod 288 which extends along the side of the hoist mechanism to the switch control area. The action of the unlocking block 286 against the flats 285 is substantially the same as that described above with regard to the first described hoist mechanism.

Figure 13:
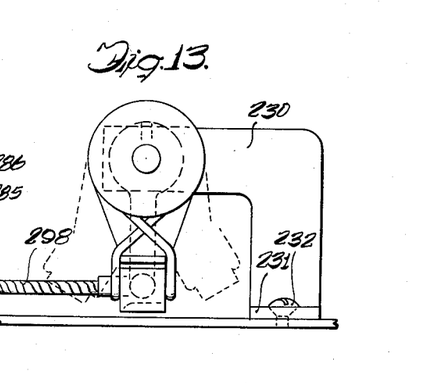
Fig. 13 is a sectional view in enlarged scale of the remote switch actuating mechanism shown in Fig. 9 and taken along section 13—13 of Fig. 9.
Figure 14:
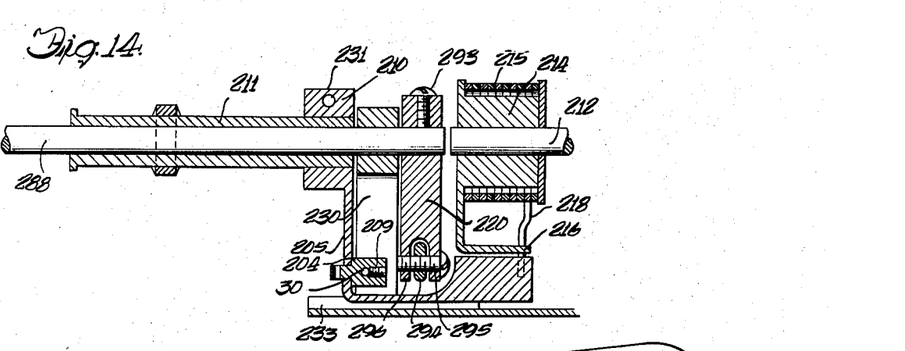
Fig. 14 is an enlarged sectional view of the remote switch actuating mechanism taken along section lines 14—14 of Fig. 9.
Figure 15:
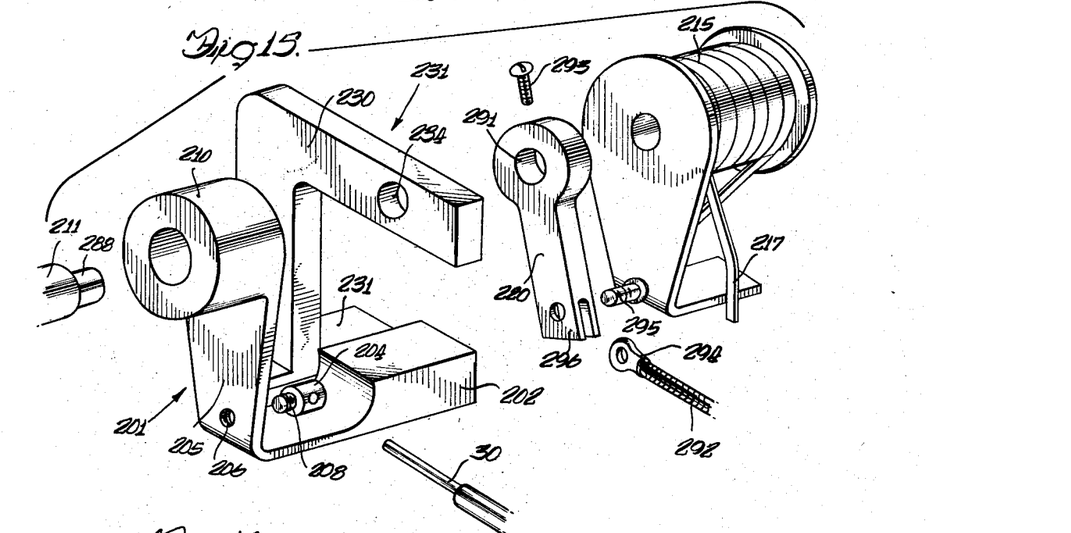
Fig. 15 is an enlarged exploded perspective view of the switch actuating mechanism shown in Figs. 13 and 14.

The switching assembly 231 is oriented coaxially around the safety brake control rod 288 as a datum. The details of the construction are best illustrated in Figs. 13, 14, and 15. There it will be seen that cable 30 is fixed to a switch control link 201. The switch link assembly 201 is L-shaped having a switch contact bar portion 202. The cable 30 is secured to the switch link portion 205 by means of cable lock assembly 204 which threadedly engages the switch link arm 205 when the threaded hole 206 receives the threaded stud portion 208 of the cable locking mechanism 204. A set screw 209 locks the cable 30 securely to the switching link 201. At the upper portion of the switch link arm 205 a hollow boss 210 is formed with its inner diameter sufficient to engage the control sleeve 211. The switch driving shaft 212 is surrounded by a spring spool assembly 214 and a coiled spring 215 with terminal ends 217, which are engaged by the switch link contact bar 202. The switch spring 215 is secured to the switch link spool 214 so that no matter which direction the rotation of the switch shaft 212 may take, the spring ends 218 will tend to turn the switch drive shaft 212 to the neutral or "off" position.

The safety brake drive cable 292 is reaved through the safety brake drive cable pulley 298 and brought into alignment with the safety brake drive link 220. The safety brake cable 292 has an eye portion 294 at its end which is secured by means of a threaded bolt 295 to the clevis 296 at the end of the safety drive brake link 220. The safety brake drive link has a bore 291 at its upper extremity which is secured by the set screw 293 to the safety brake control rod 288. A mounting bracket 230 has a flat base 233 secured by means of bolts 232 to the housing of the electric hoist 218. The mounting brace bore 234 is proportioned to journal the safety brake control rod 288. A limit link assembly 262, similar to that described in the first embodiment of an electric hoist 18 is employed. The limit bar assembly 262 has two legs 265, 266 and a safety ring 270 adjacent the curved end portion 271 which joins the two legs. A limit link 261 is secured to a limit link pivot rod 264 and drives the control sleeve 211 by means of the control sleeve extension arm 280. The clevis 283 at the end of the control sleeve extension arm 280 is secured to the limit link 261 by means of a pin and cotter key assembly 274.

The cooperative relationship of the various parts of the switch assembly 231 and limit assembly 262 will be better understood as their operational cycle is reviewed. As the hand control assembly is manipulated transmitting a push-pull to the control cable 30, the control link bar 202 contacts the spring ends 217 and rotates the switch drive shaft 212 thereby starting the motor. Simultaneously with this action, the solenoid assembly 250 is actuated and the solenoid drive cable 292 imparts a twist to the safety brake control rod 288 thereby releasing the safety brake.

As the limit upward travel of the hoisting chain or cable is reached, the limit bar assembly 262 is actuated which drives the limit link and switch sleeve extension 280. Since the control sleeve 211 is coupled to the control switch link 201 this action manually returns the switch assembly to neutral, shuts off the motor, and releases the energizing effort on the solenoid 250 thereby locking the safety brake. As in the case of the first embodiment described above, the actuation of the limit assembly 262 is transmitted through the switch control cable 30 back to the hand of the operator so that again his sense of touch, as well as sense of sight, advises him that the upward limit of travel has been reached, or that the hoist mechanism is otherwise inoperative.

In review it will be seen that a simple, rugged, and yet effective remote manual control system for an electric hoist has been provided. The remote switch mechanism held in the hand of the operator is entirely safe to use as no electric current is passed to the hand of the operator. In addition, the operator can actuate the control device with one hand, leaving his other hand free to manipulate the load or move the electric hoist along its mono-rail support.

Although particular embodiments of the invention have been shown and described in full here, there is no intention to thereby limit the invention to the details of such embodiments. On the contrary, the intention is to cover all modifications, alternative embodiments, usages and equivalents of the remote manual switching mechanism for electric hoist as fall within the spirit and scope of the invention, specification, and appended claims.

I claim as my invention:

1. For use with an electric hoist driving a flexible tension member with load engaging means at the end thereof, a remote switching mechanism comprising, in combination, a motor control switch having "up," "down," and "off" positions, yieldable means urging said switch into the "off" position, a hand control unit, a cable and associated sheath secured to the hand control, a shift on the hand control coupled to the cable, bracket means on the hoist anchoring the cable sheath to the hoist, a switch link pivoted to the hoist and adapted to actuate the hoist control switch when pivoted, a limit bar pivoted to the hoist, means on the limit bar for engaging the load engaging means when the load approaches the hoist thereby shifting the limit bar, link means coupling the limit bar to the switch link, and means coupling the cable with the switch link thereby translating the operator's motion of the hand control shift into an actuation of the power control switch and similarly translating the actuation of the limit bar back to the operator's hand control shift.

2. For use with an electric hoist driving a flexible tension member with load engaging means at the end thereof, a remote switching mechanism comprising in combination, a motor control switch with raising, lowering, and neutral power positions, yieldable means constantly urging said motor control switch to the neutral power position, a hand control unit, a cable and associated sheath secured to the hand control, a shift on the hand control coupled to the cable, means on the hoist anchoring the cable sheath to the hoist, a switch link pivoted to the hoist and adapted to actuate the hoist control switch when pivoted, a limit bar pivoted to the hoist, means on the limit bar for engaging the load engaging means when the load approaches the hoist thereby shifting the limit bar, link means coupling the limit bar to the switch link, and means coupling the cable with the switch link thereby translating the operator's motion of the hand control shift into an actuation of the power switch to the raising, lowering, and neutral power settings.

3. For use with an electric hoist having a motor switch with "forward," "reverse," and neutral "off" positions, yieldable means associated with said motor switch constantly urging the motor switch to the "off" position, and a load engaging element at the end of a coilable lifting element, a remote manual switching assembly comprising, in combination, a hand control unit, a control cable and associated sheath, the sheath being anchored to the hand control unit, a shift on the hand control unit coupled to the control cable adapted to impart a reciprocating movement to the control cable, bracket means on the hoist anchoring the control cable sheath to the hoist, a switch link on the hoist adapted to pivot relative to the hoist and coupled to the motor switch, a limit bar pivoted to the hoist at a central portion, means on the limit bar to engage the lifting element thereby pivoting the limit bar, a limit link pivoted at one end to the limit bar and pivoted at the other end to the switch link, and means coupling the control cable to the switch link.

4. For use with an electric hoist having a rotatable motor control switch with "raise," "lower," and neutral "off" positions, yieldable means associated with said motor control switch to constantly urge the motor switch to the "off" position, and a load engaging element at the end of a coilable lifting element, a remote manual switching assembly comprising, in combination, a hand control unit, a control cable and associated sheath, the sheath being anchored to the hand control unit, a shift on the hand control coupled to the control cable to impart a reciprocating movement to the control cable, bracket means on the hoist anchoring the control cable sheath to the hoist, a switch link on the hoist anchored at one end to the rotatable motor control switch, a limit bar pivoted to the hoist at a central portion, means on the limit bar to engage the lifting element thereby pivoting the limit bar, a limit link pivoted at one end to the limit bar, and pivoted at the other end to the switch link, and means coupling the control cable to the switch link whereby the operator's shifting of the hand control shift controls the raising and lowering of the hoist, and any lifting beyond the upper limit of lift turns the switch to the "off" position with a corresponding movement to the hand shift.

5. For use with an electric hoist having a motor control switch with "up," "down," and "off" positions and a load engaging element at the end of a coilable lifting element, a remote manual switching assembly comprising, in combination, a control cable and associated sheath, the control cable being adapted to transmit rotation, a hand control unit anchored to the control cable sheath, shift means on the hand control unit secured to the cable and adapted to impart a manually induced rotation to the control cable, bracket means on the hoist anchoring the control cable sheath to the hoist, a switch link coupled to the hoist control switch, gear means coupling the control cable to the switch link so that rotation of the control cable causes the switch link to pivotally actuate the motor control switch, a limit bar pivoted to the hoist, means on the limit bar engageable with the hoist lifting element to pivot the limit bar, and limit link means coupling the limit bar to the switch link whereby the pivoting of the limit bar by the load engaging element is translated into a switch link movement which switches the power source of the hoist to the off position.

6. For use with an electric hoist having a rotatable motor control switch with "forward," "reverse," and "off" positions, and a load engaging element at the end of a coilable lifting element, a remote manual switching assembly comprising, in combination, a control cable and associated sheath, the control cable being adapted to transmit rotation, a hand control unit anchored to the control cable sheath, shift means on the hand control unit secured to the cable and adapted to impart a manually induced rotation to the control cable, bracket means on the hoist anchoring the control cable sheath to the hoist, a switch link anchored to the motor control switch, an arcuate gear fixed to the rotatable motor switch and coaxial therewith, a pinion gear on the control cable meshing with arcuate gear so that rotation of the control cable causes the switch and switch link to pivot, a limit bar pivoted to the hoist, means on the limit bar engageable with the hoist lifting element to pivot the limit bar, and limit link means coupling the limit bar to the switch link whereby the pivoting of the limit bar by the load engaging element is translated into a switch link movement which switches the power source of the hoist and the hand shift to the off position.

7. In an electric hoist having a safety brake controlled by a longitudinal rod, a motor control switch having "raise," "lower," and "off" positions, and coilable hoist means with a load engaging element at the end thereof, a remote manual switch mechanism comprising, in combination, a cable and associated sheath, a hand control unit, a shift pivoted to the hand control unit and coupled to the control cable to deliver a reciprocating motion to the control cable, a cable sheath support on the hoist anchoring the sheath against movement relative to the hoist, a control sleeve, the control sleeve being journaled on the safety brake control rod, a switch link integral with the control sleeve, the switch link being secured to the control cable, a limit bar pivoted to the hoist and oriented for pivoting by the load engaging element of the hoist at its upward limit of travel, a limit arm secured to the control sleeve, and a limit link pivotally connected to the limit bar and limit arm thereby transmitting the limit bar action to the control switch and hand control unit shift.

8. In an electric hoist having a safety brake controlled by a longitudinal rod, a rotatable motor control switch having "raise," "lower," and "off" positions, and coilable hoist means with a load engaging element at the end thereof; a remote manual switch mechanism comprising, in combination a cable and associated sheath, a hand control unit, a shift pivoted to the hand control unit coupled to the control cable delivering a reciprocating motion to the control cable, a cable sheath support on the hoist anchoring the sheath against movement relative to the hoist, a control sleeve journaled on the safety brake control rod, a switch link secured to the control sleeve and secured to the control cable, control switch engaging means extending from the switch link to the rotatable motor control switch, a limit bar pivoted to the hoist and oriented for pivoting by the load engaging element of the hoist at its upward limit of travel, a limit arm secured to the control sleeve, and a limit link pivotally connected to the limit bar and limit arm thereby transmitting the limit bar action to the control switch and hand control unit shift.

References Cited in the file of this patent

UNITED STATES PATENTS

| | | |
|---|---|---|
| 1,369,147 | Valls | Feb. 22, 1921 |
| 2,586,722 | Rutherford | Feb. 19, 1952 |
| 2,681,954 | King | June 22, 1954 |